July 1, 1969 SHOICHI MIYASHIRO ET AL 3,453,484

STORAGE DEVICE

Filed Jan. 24, 1966 Sheet 1 of 6

Shoichi Miyashiro
Shunji Shirouzu
INVENTORS
BY George B. Oujevolk
Attorney

Shoichi Miyashiro
Shunji Shirouzu
INVENTORS

BY George B. Oujevolk
Attorney

STORAGE DEVICE

INVENTORS
Shoichi Miyashiro
Shunji Shirouzu
BY
George B. Oujevolk
Attorney

INVENTORS
Shoichi Miyashiro
Shunji Shirouzu
BY
George B. Oujevolk
Attorney

Shoichi Miyashiro
Shunji Shirouzu
INVENTORS

BY George B. Oujevolk
Attorney

United States Patent Office 3,453,484
Patented July 1, 1969

3,453,484
STORAGE DEVICE
Shoichi Miyashiro and Shunji Shirouzu, Yokohama-shi, Japan, assignors to Tokyo Shibaura Electric Co., Ltd., Kawasaki-shi, Japan, a corporation of Japan
Filed Jan. 24, 1966, Ser. No. 522,695
Claims priority, application Japan, Jan. 25, 1965, 40/4,565; Feb. 10, 1965, 40/6,989; Feb. 17, 1965, 40/8,621
Int. Cl. H01j 29/56, 31/26
U.S. Cl. 315—10 16 Claims

ABSTRACT OF THE DISCLOSURE

A storage device having first and second annular electrodes which are connected with each other. The second annular electrode has an axial length less than 0.45 times its inner diameter. A field mesh is mounted in parallel with a target at the joint between said first and second annular electrodes. There is a deflection means, the center of the deflection being spaced from said field mesh by a distance equal to from 1.25 to 4.25 times the inner diameter of the second annular electrode, and there are means to supply to the field mesh the maximum potential with respect to an electron beam emitted from an electron gun.

Figure 1:
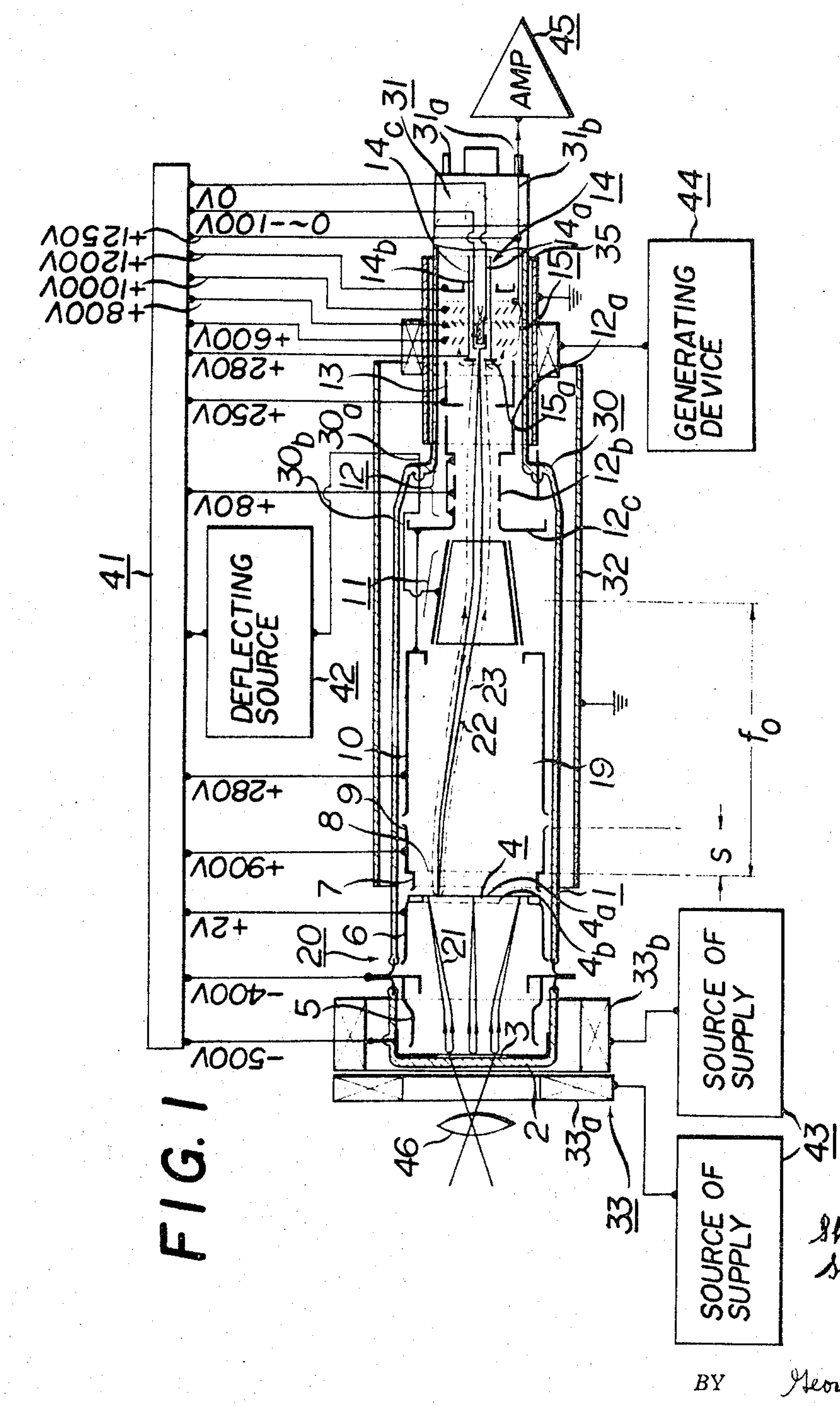

This invention relates to storage devices, such as a television pickup tube, a storage tube and the like which will store or accumulate charge patterns on a target and then read-out the stored charge patterns by means of an electron beam.

A storage device, or an image pickup device, for instance, operates to pick up an object so as to provide television signals. An image pickup tube which is an essential part of the storage device comprises a target which acts to temporarily preserve the image of the object in the form of a charge pattern, and means to take out the charge pattern as a video signal by scanning the surface of the target by an electron beam. The electron beam is formed by an electron gun, focussed and deflected and is finally moved at a low speed across the target to scan it thus discharging the electrostatic charge of the video signal stored on the target. As is well known to those skilled in the art it is necessary to cause the scanning beam to impinge at right angles upon various portions of the target including both the central portion and the peripheral portion in order to obtain satisfactory signals.

As a method of such a low speed electron scanning, an electromagnetic deflection-electromagnetic focussing method is used in the conventional image orthicons and vidicons. While this method is now used to a considerable extent it is not satisfactory in that it cannot solve the problem of impinging the scanning beam at right angles over the entire surface of the target. More particularly, in some cases the discharge for neutralizing the charge accumulated on the target is not uniform throughout the surface thereof. As a result a dark shadow or the so-called corner shading is formed on the peripheral portion of the reproduced image. Moreover owing to a poor landing efficiency of the electron beam on the target it is required to pass a large primary beam current thus resulting in a substantial decrease of the signal to noise ratio. Further, in an image pickup tube such as an image orthicon wherein the return beam is guided toward a secondary electron multiplier to obtain a signal output, the return beam tends to spread to decrease the output signal. In addition because the return beam does not return uniformly to the first dynode of the secondary electron multiplier a dynode shading is formed in the image. There is also an additional defect that an image of the secondary electron multiplier is superposed on the peripheral portion of the image. It is believed that the above mentioned defects of characteristics of the image pickup tube utilizing the electromagnetic deflection-electromagnetic focussing system are caused by inaccurate alignment of the magnetic field produced by the focussing coil and by the deflecting coil and the electric field produced by various electrodes disposed in the tube. For example, it was found that unexpectedly large shading was produced when components containing a magnetic material which has not been investigated thoroughly were disposed inside and outside of the tube.

Moreover, the above mentioned devices utilizing the electromagnetic deflection-electromagnetic focussing system such as image orthicons, vidicons and the like require extremely long electromagnetic coil assemblies thus resulting in a large size, heavy weight and very large power consumption in the deflection and focussing coils.

These fatal defects of large size and weight of the device can be greatly alleviated by utilizing the electrostatic scanning system. Additionally, it is desirable to simplify the construction of the image section. More particularly, in the image orthicon type image pickup tube, for example, an electrostatic electron lens may be used as the image section so that the electron current produced by a photocathode surface may be accelerated and focussed on the target. Whereas at the scanning section the electron beam which is deflected is caused to impinge at right angles upon the storage target, again by utilizing an electrostatic electron lens. This system can eliminate the use of a long coil thus greatly reducing the weight of the device when compared with the wholly electromagnetic system mentioned above.

However, the conventional electrostatic image section is generally liable to produce so-called pincushion distortion in addition to decreasing the resolution at the peripheral portion when a focal point is produced at the center of the image. Even if the length of the image section were increased to solve this problem the resolution and distortion of the conventional electrostatic image section would be inferior to the electromagnetic focussing type image section. Increase in the length of the image section of course results in the increase in the total length as well as configuration of the tube.

In addition, in the electrostatic type electron beam scanning section, focusing of electron beam is not sufficient so that it is not possible to obtain a high resolution. Although it is highly desirable in the image pickup tube to cause the electron beam to impinge at right angles upon the whole surface of the target, with the prior electrostatic type scanning system it has been impossible to provide an electron lens that can fully satisfy said requirement. As a result it was heretofore impossible not only to obtain satisfactory image signals but also to derive out signals by utilizing the return beam. Thus it has been impossible to complete an image orthicon provided with a satisfactory electrostatic type scanning section having characteristics comparable with those of the conventional image orthicon device including the electromagnetic type scanning section.

Accordingly an object of this invention is to provide a novel storage device provided with a small and light weight electrostatic type electron beam scanning section of excellent characteristics and handled easily.

Another object of this invention is to provide a new and improved storage device provided with an electrostatic type electron beam scanning section which can produce satisfactory image signals of high resolution and yet is substantially free from any shading or distortion.

In accordance with this invention there is provided a storage device comprising an evacuated envelope, an electron gun disposed in said envelope to emit an electron beam, a target disposed to oppose said electron gun upon which said electron beam impinges at a low speed, a first annular electrode whose inner diameter is greater than the diameter of the effective circular portion of the target defined by an annular metal foil and located adjacent to the target on the side facing the electron gun, a second annular electrode connected to said first annular electrode so as to extend towards said electron gun, said second annular electrode having an axial length less than 0.45 times its inner diameter, a field mesh mounted in parallel with said target at the joint between said first and second annular electrodes, a deflection system adapted to make horizontal and vertical deflections of said electron beam to cause it to scan said target, the effective centers of said horizontal and vertical deflections being adapted to coincide with each other, said center being spaced from said field mesh by a distance equal to from 1.25 to 4.25 times of the inner diameter of said second annular electrode, and means to apply to said field mesh the maximum potential with respect to said electron beam.

Figure 2:
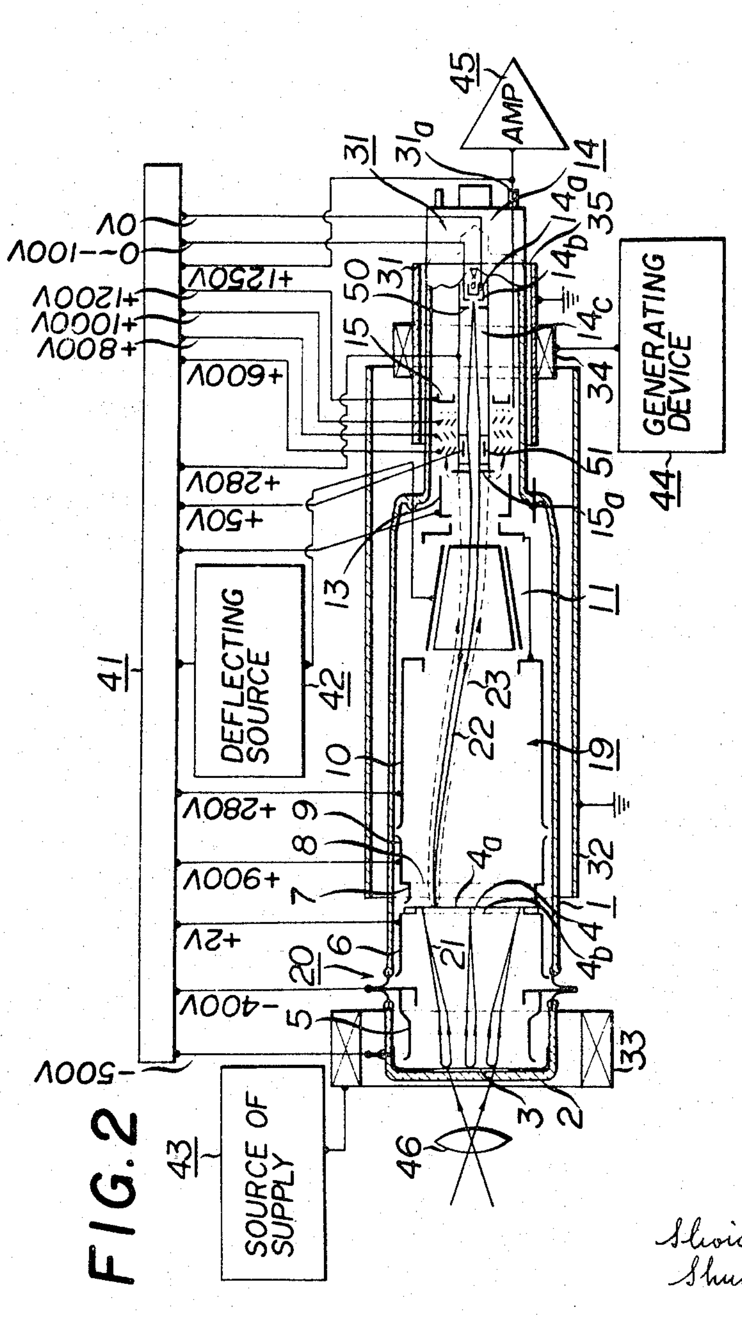
Figure 3:
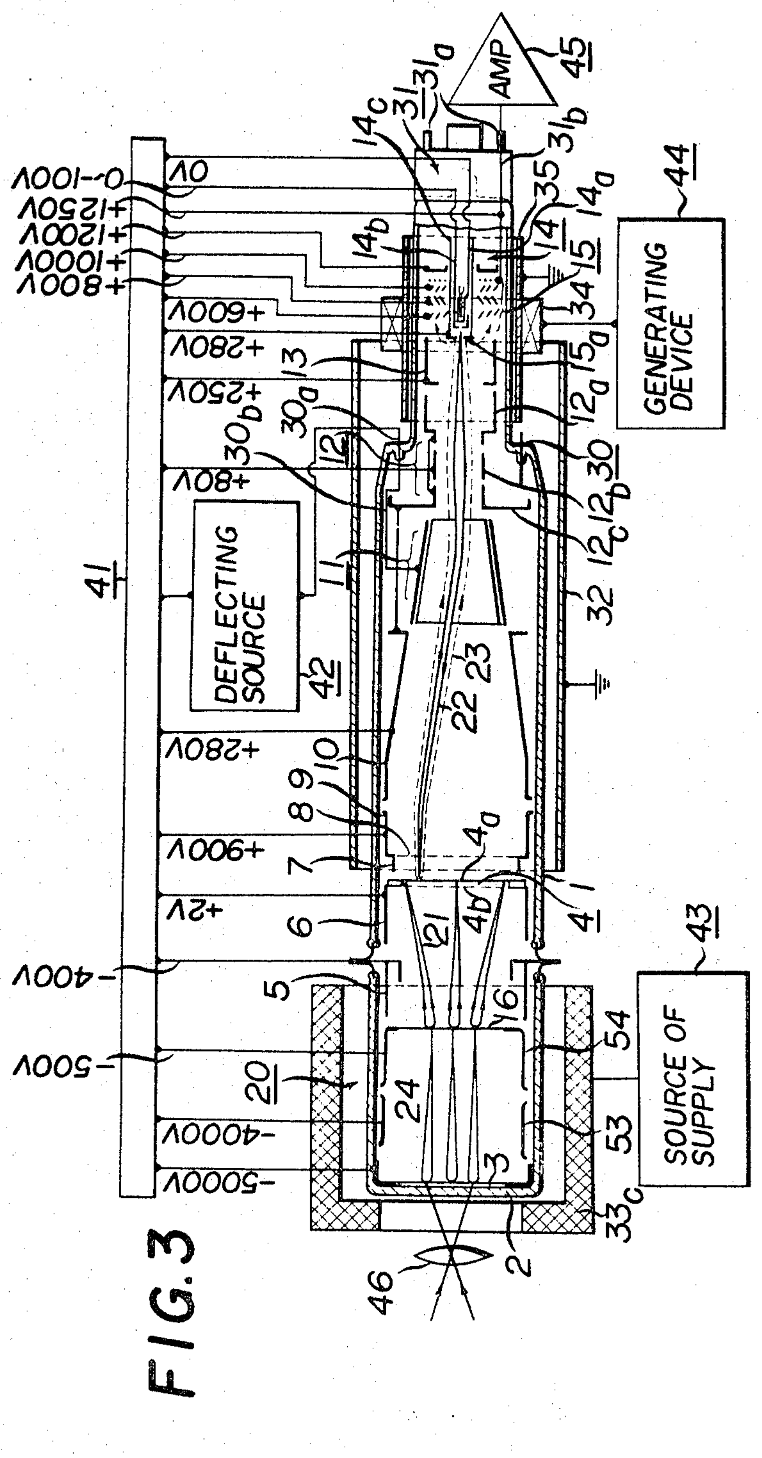
Figure 6:
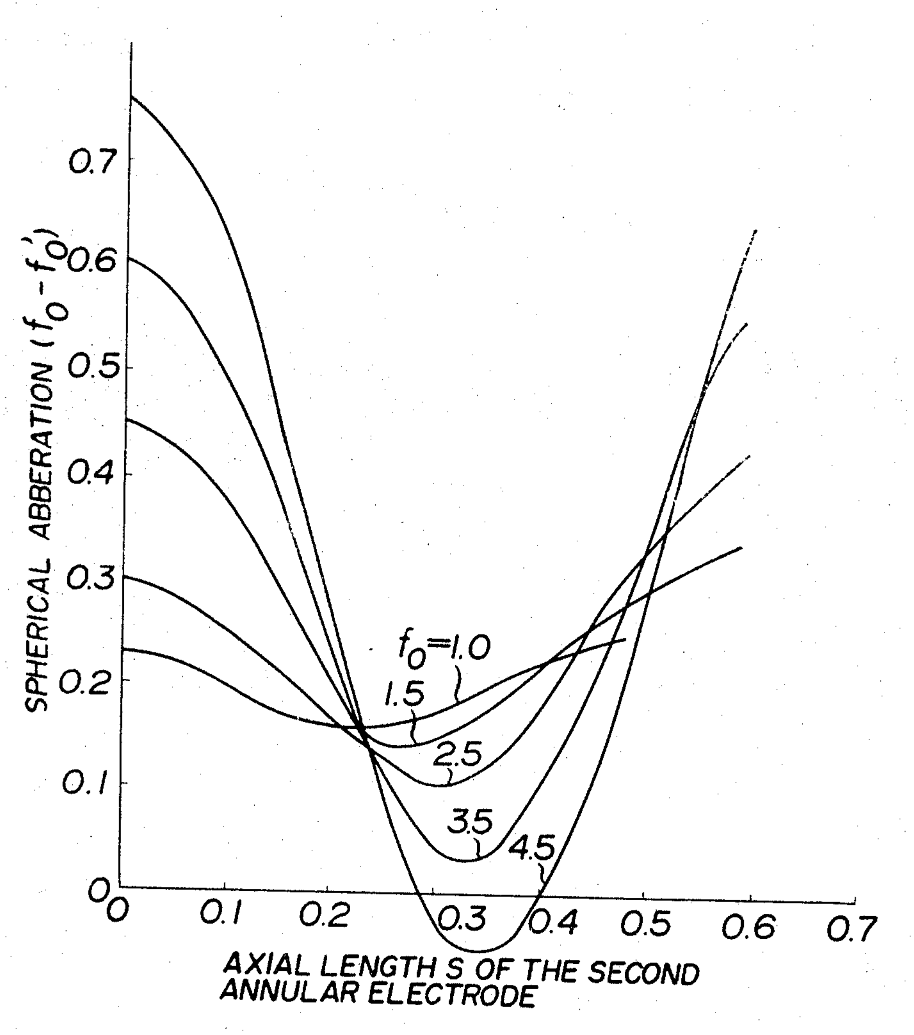

Further objects and advantages of the invention will be more clearly understood from the following detailed description taken in conjunction with the accompanying drawings. Throughout the drawings like reference numerals designate the same or corresponding parts. In the drawing, FIG. 1 shows a longitudinal section, partly broken away, of one embodiment of this invention;

FIGS. 2, 3, *4a* and *5a* inclusive show schematic longitudinal sections, partly broken away, of another embodiment of this invention;

FIGS. *4b* and *5b* show curves showing distribution of electric field at the image sections of FIGS. *4a* and *5a*, respectively; and FIG. 6 shows characteristic curves to explain the embodiment shown in FIG. 1.

Referring now to the accompanying drawings, FIG. 1 illustrates an image orthicon as one embodiment of this invention. There is a face plate 2 located at one end of an evacuated tubular glass envelope 1 having an enlarged portion coated with a photocathode surface layer 3. A cylindrical image focusing electrode 5 and a target cup electrode 6 are mounted respectively coaxially with said layer 3. At one end of the target cup electrode 6 and opposite the photocathode surface layer 3 is disposed a storage target membrane **4*a* consisting for instance of glass or a semiconductor membrane. A target mesh 4*b* is provided in parallel with and adjacent to the target membrane 4*a* on the side of the photocathode surface layer 3, thus completing a target 4. The above mentioned electrodes 3, 5, 6 and 4 constitute an image section 20. A cathode 14*a* including a heater, a first grid electrode 14*b* and a second grid electrode 14*c* are coaxially disposed at the opposite end of the evacuated envelope 1 to form an electron gun. A secondary electron multiplier section 15 is provided to surround the electron gun and a disc shaped first dynode 15*a* having a central aperture for passing electrons is provided adjacent the second grid electrode 14*c* on the side thereof facing the target. Further, at the front end of the electron gun 14 is mounted a persuader electrode 13 adapted to drive secondary electrons produced by the first dynode by the action of the return beam 23 into the later stages of the multiplier and, a unipotential type focusing electrode system 12 adapted to focus the electron beam and consisting of third, fourth and fifth grid electrodes 12*a*, 12*b* and 12*c* is disposed adjacent the persuader electrode on the side thereof facing to the target. Also a cylindrical sixth grid electrode 10 is coaxially mounted with an electrostatic deflecting system 11 interposed between the fifth and sixth grid electrodes 12*c* and 10, said electrostatic deflecting system 11 serves to deflect the electron beam in the horizontal and vertical directions. The third, fifth and sixth grid electrodes 12*a*, 12*c* and 10** are electrically interconnected in the envelope.

Further a field mesh electrode 8 is mounted between the sixth grid electrode 10 and the target 4 in parallel therewith. The spacing between the field mesh electrode and the target is about 8 mm. If the spacing between the field mesh electrode 8 and the target membrane were too small, an image of the mesh would be reproduced thus generating an apparent beat pattern because the spot size of the electron beam has been considerably reduced when the scanning beam 22 focused on the target **4*a* passes through the mesh electrode. In order to avoid this phenomenon it is desirable to make the spacing more than several millimeters. On the peripheral edge of the field mesh electrode there is mounted a first annular electrode 7 to face the target 4, said first annular electrode having an inner diameter larger than the diameter of the target membrane 4*a*. A second annular electrode 9 having an axial length 0.2 times larger than its inner diameter is connected to the first annular electrode 7 to extend towards the electron gun. Thus the field mesh electrode 8 is disposed at the joint between the first and second annular electrodes 7 and 9. These first and second annular electrodes 7 and 9 and the field mesh electrode 8** are electrically connected with each other.

These electrodes together with the sixth electrode 10 constitute a collimation electron lens for collimating the electron beam in the space of the electron beam path 22. Each pair of horizontal and vertical deflecting electrodes 11 is located near the focal point of the collimation lens, with the centers of deflection coinciding, at a position remote from the field mesh by a distance about two times of the inner diameter of the second annular electrode 9 whereby an electron beam scanning section 19 is formed.

At the image section 20 there is provided a magnetic field generating device 33 on the outside of the envelope to generate a focussing magnetic field to focus electrons in the image section 20. The device 33 may be divided into a plurality of sections, for example two and may comprise electromagnetic coils, permanent magnets or a combination of them. Where electromagnetic coils are used, coils **33*a* and 33*b* may be independently energized from a source of current 43 so that their currents may be independently adjusted. Adjustment is made to provide the best points on the characteristic curve but when the focussing magnetic field is varied by varying the relative intensities of respective magnetic fields the focussing condition of the photoelectrons 21 emitted from the photocathode surface 3** will be varied to increase or decrease the magnification factor of electron images. Thus, in lieu of an optical lens an electronic zooming can be effected.

It is to be particularly noted that the envelope utilized in this embodiment has a novel configuration. More specifically, the diameter of the envelope section containing the electron gun 13 and the focussing electrode 12 is made smaller than the diameter of the other envelope section which contains remaining components of the tube. As a result, the joint between these sections of different diameters is step shaped where a shoulder stem 30 may be formed. Extending through the shoulder stem 30 are sealed conductor strips **30*a* which may be in the form of pins. Since the shoulder stem 30 is located near the deflecting system 11, it is possible to shorten the length of lead wires 30*b* which interconnect the deflecting system and the conductor strips. This means that leakage of the saw tooth voltage supplied from the deflecting source 42 does not affect output signals. Thus output signals obtained from the secondary electron multiplier section 15 are taken out through conductor strips extending through a stem 31 at the end of the envelope 1 adjacent the electron gun and are then supplied to a pre-amplifier 45 via base pins 31*a*. Consequently output signals would not be affected by the leakage of the deflecting voltage. Sections of different diameters of the envelope are surrounded by cylindrical magnetic shields 32 and 35**.

The operation of the storage device shown in FIG. 1 is as follows:

A source of supply 41 supplies −500 v. to the photocathode surface 3, −400 v. to the image focussing electrode, +2 v. to the target cup electrode 6, 900 v. to the field mesh electrode 8, 280 v. to the third fifth and sixth grid electrodes 12*a*, 12*c* and 10, 80 v. to the fourth grid electrode 12*b*, 250 v. to the persuader electrode 13, 280 v. to the second grid electrode 14*c* and 0 v. to the cathode electrode 14*a*, respectively, as described in FIG. 1. Thereafter an optical image is focussed on the photocathode surface 3 by means of an optical lens 46 to emit photoelectrons 21 from the surface 3. The photoelectrons are accelerated and focussed by the combined action of the electrostatic field produced by the image focussing electrode 5 and by the target cup electrode 6 and the focussing magnetic field generated by the magnetic field generating device 33 whereby an electron image corresponding to the optical image is focussed on the storage target membrane 4*a*. When impinged by photoelectrons the membrane 4*a* emits secondary electrons which are collected by the target mesh electrode 4*b*. As a result a positive charge pattern corresponding to the optical image will be accumulated on the storage target membrane 4*b*.

The electron beam emitted from the electron gun 14 is directed in the axial direction by means of an alignment magnetic field generating device 44, accelerated and focussed by the beam focussing electron lens formed by the focussing electrode 12 and is then deflected by the deflecting system 11 so as to scan the target membrane 4*a*. It should be understood that the alignment magnetic field generating device 44 may comprise either an electromagnetic coil or a permanent magnet. Thereafter the electron beam enters into the region of the collimation lens and the direction of travel of the electron beam is corrected to be parallel with the tube axis, not only in the central portion but also in the peripheral portion, by the suitable positioning of the deflecting system 11 relative to said collimation lens. Thus the electron beam impinges perpendicularly upon the target membrane 4*a*. In this way the charge pattern accumulated on the target membrane 4*a* will be discharged so that the modulated return beam 23 will return to the electron gun 14 along substantially the same path as the forward beam 22. The return beam tends to spread considerably as it departs from the storage target membrane 4*a* depending upon the difference in initial speed vectors at the time when the beam is rebounded by the target membrane or by the action of the electrostatic field prevailing between the target and the deflecting system. However by the collimation lens formed in accordance with this invention the return beam is caused to impinge upon the first dynode 15*a* of the electron multiplier section 15 at a high efficiency, and after being amplified by the multiplier section supplied as the output signal to the pre-amplifier 45 located outside the tube 1.

The operative relation between the first and second annular electrodes 7 and 9 and the field mesh electrode 8 which are the principal electrodes comprising the collimation lens, and the electrostatic deflecting system 11 will now be discussed by reference to FIG. 6 of the accompanying drawings. Generally the electron beam 22 impinges at right angles upon the target so long as it is scanning the central region of the target. However, in the case of a frame scanning, for example, since the scanning beam departs remotely from the central region because of the spherical aberration of the collimation lens it becomes difficult to impinge at right angles. Further, an abrupt bend of the electric field about the peripheral region very close to the target tends to render the corresponding annular portion of the reproduced image unsatisfactory. It has been found by experiment that the following construction is most suitable to eliminate such an undesirable phenomenon.

Thus, the inner diameter of the first annular electrode 7 which is one of the electrodes that constitute the collimation lens is made larger than the diameter of the target membrane 4*a*. Further, the axial length of the second annular electrode 9 is selected to be less than 0.45 times, of the inner diameter thereof. Moreover, both horizontal and vertical deflections of the deflection system 25 are selected to have substantially the same deflection center which is separated from the field mesh electrode 8 measured in the direction toward the electron gun 14 by a distance equal to from 1.25 to 4.25 times of the inner diameter of the second annular electrode 9. The reason for this selection can be clearly noted from FIG. 6 which illustrates the quantity of electron orbits inside the collimation lens corresponding to the spherical aberration. The abscissa represents the axial length S of the second annular electrode 9 while the ordinate represents the spherical aberration ($f_0-f_0'$) where $f_0$ is the focal length for the paraxial electron beam, and $f_0'$ is the focal length for the beam consisting non-paraxial electrons. By the non-paraxial electrons is meant the electrons emitted from the points of the target sufficiently apart from the tube axis, for example 0.6 times the radius of the effective circular portion of the target apart from the tube axis, the parameter of the curves plotted in FIG. 6 being the focal length $f_0$ for the paraxial electron beam. All units are represented by taking the inner diameter of the second annular electrode 9 as the reference.

From FIG. 6 it can be noted that the spherical aberration ($f_0-f_0'$) becomes minimum at a certain value of S for a certain value of $f_0$.

When the value of S is selected to be less than 0.45 times of the inner diameter of the second annular electrode 9, preferably within the range of from 0.10 to 0.45 times there appears the minimum of the spherical aberration, which is of course most suitable. The operation of the return beam 23 is as follows: The non-paraxial electrons of the electric field produced by the second annular electrode 9 are slightly curved outwardly by that field when they pass at right angles the field mesh electrode 8. Then these electrons enter into the electric field formed by the cooperation of the second annular electrode 9 and the sixth grid electrode 10 and are bent toward the tube axis to approach the point on the tube axis at which paraxial beam cross the axis. This is the most suitable condition where the spherical aberration becomes mininum.

When the length S is made more larger, non-paraxial electrons from the target membrane 4*a* are emitted at right angles as in the previous case and when passing through the field mesh electrode these electrons are bent considerably by the electric field produced by the second annular electrode . Thereafter, as the non-paraxial electrons enter into an extremely strong electrostatic lens formed by the second annular electrode, the sixth grid electrode and the like, the point at which they cross the tube axis will shift toward the field mesh electrode. In other words the spherical aberration ($f_0-f_0'$) is too large and hence is not suitable.

Thus it will be understood that the preferable value of S is less than 0.45 times of the inner diameter of the the second annular electrode, advantageously to be in a range of from 0.10 to 0.45 times.

While in the foregoing description the path of the return beam returning from the target has been explained it will be obvious that the path of the forward beam is the same as that of the return beam.

The focal length $f_0$ of paraxial electrons emitted from the central region of the target membrane 4*a* will now be considered.

With too small value of $f_0$ it is not only impossible to minimize the spherical aberration but also the deflection angle of the electron beam is increased thus causing difficulties in the design of the deflecting system.

As shown in FIG. 6, when the value of $f_0$ is too large, there may be a chance that the spherical aberration ($f_0-f_0'$) becomes zero, but since the inclination of the curve is steep, a slight error in the value of S results in a large change in the operation. Furthermore, too long focal length $f_0$ results in the increase of the distance from focussing lens to the target as compared to the distance from the cathode electrode 14 of the electron gun up to the focussing lens, thus affecting the spot size of the beam on the target. This also results in the increase of the tube length as well as in the decrease of the resolution of the scanning beam. Further, as in the case of an image orthicon type pickup tube, where signals are obtained from the return beam, the return beam will spread to such an extent that the entire beamspread cannot be included within the effective area of the deflection system and also within the effective area of the first dynode 15*a* of the secondary electron multiplier 15. Thus, it will be clear that it is not advantageous to make too large the focal length $f_0$, and it was concluded that the most suitable value of the focal length $f_0$ should be in a range of from 1.25 to 4.25 times of the diameter of the second annular electrode.

Turning now to the first annular electrode 7, in the absence of this electrode it is quite impossible for the electrons remote from the axis to impinge at right angles upon the peripheral portion of the target membrane 4*a*, thus creating an annular peripheral region where reproduction of the image is quite impossible. Such a phenomenon is especially remarkable where the distance between the target and the field mesh electrode is made large in order to prevent beat pattern, thus decreasing the effective operating area of the target. Further when reproduced on the monitor, the annular region in which reproduction of image is impossible will appear as an extremely strong white signal which affects the amplifier system in such a manner that horizontal black tails are often produced thus producing shading effect in the image.

This defect can be obviated by providing the first electrode 7 having a diameter larger than that of the target membrane 4*a*, as has been described in connection with the illustrated embodiment.

As described above, according to this invention all of the above described defects can be eliminated because in the storage device of this invention there is an electron gun provided in an evacuated envelope, a target is arranged to face the electron gun, a first annular electrode having an inner diameter larger than the diameter of the target is positioned near the target on the side thereof near the electron gun, a field mesh electrode is mounted on the end of the annular electrode adjacent the electron gun, a second annular electrode is connected to the first annular electrode to clamp the mesh electrode therebetween, said second annular electrode having an axial length of less than 0.45 times of its inner diameter, preferably from 0.1 to 0.45 times thus forming a collimation lens, and deflection systems are provided to have the same deflection centers at a point remote from the field mesh electrode of the collimation lens by a distance equal to from 1.25 to 4.25 times of the diameter of the second annular electrode. The electrostatic image orthicon embodying the principle of this invention is advantageous over the conventional electromagnetic image orthicon in that there is no shading phenomenon, that a long coil assembly is not necessary whereby a television camera of small size and light weight can be readily provided. Further, as no coil assembly of the conventional type is used in the electromagnetic image orthicon it is possible to design the target sufficiently large, thus greatly improving various characteristics of the image pickup tube such as the signal to noise ratio, resolution and the like. By utilizing the image pickup tube constructed in accordance with this invention, television broadcasting activity as well as the quality of the broadcasted picture are revolutionarily improved. The novel pickup tubes can also be used for industrial television.

FIG. 2 shows a modification of this invention which also includes various electrodes 7, 8 and 9 comprising the collimation lens as in the embodiment shown in FIG. 1, and wherein the position of the first dynode 15*a* of the secondary electron multiplier section is specially devised. More specifically, an electron gun 14 supported by a stem 31 formed at one end of an evacuated tubular envelope 1 comprises a cathode 14*a* including a heater, a first grid electrode 14*b* and a second grid electrode 14*c* concentrically enclosing the cathode electrode. The second grid electrode 14*c* takes a form of a long cylinder extending to a point near the deflecting system 11 and contains therein three diaphragm apertures 50 for the electron beam 22. A cap shaped first dynode 15*a* having a small opening at its center is provided adjacent the second grid electrode 14*c* to face the storage target membrane 4*a*. The dynode 15*a* is comprised of a silver plate having a surface which is sand blasted and on which there is vapour deposited a thin film of chromium in order to provide a uniform secondary electron emission ratio and a uniform substrate surface.

Inside the second grid electrode 14*c* there is mounted a focussing electrode 51 adapted to focus the electron beam 22 on the storage target 4*a*. Further a cylindrical persuader electrode 13 is disposed coaxially with the first dynode 15*a* in order to persuade secondary electrons from the first dynode 15*a* into the succeeding stage of the secondary electron multiplier section which is disposed to surround the second grid electrode 14*c* so as to collect the secondary electrons from the first dynode 21. Adjacent the persuader electrode 13 are positioned horizontal and vertical deflection electrodes 11 having substantially the same deflection center and an electrode 10 or a sixth grid electrode having a cylindrical wall is arranged coaxially with the deflection electrodes. Other components are constructed identical with those of the embodiment shown in FIG. 1 so that these components are designated by the same reference numerals and it is believed unnecessary to duplicate description thereof.

The operation of the embodiment shown in FIG. 2 is as follows:

The electron beam 22 emitted from the cathode electrode 14*a* passes through the beam diaphragm opening 50 of the second grid electrode 14*c* to be accelerated thereby and then focussed by the focussing electrode 51 upon the storage electrode 4*a*. Thereafter the beam is further reduced in diameter by a small aperture of the second grid 14*c* and then enters into the deflection system 11. After being deflected by the deflection system, the beam is caused to impinge at right angles onto the target membrane 4*a* by the action of the collimation lens comprised by the sixth grid electrode 10, the second annular electrode 9, the field mesh electrode 8, the first annular electrode 7, and the storage target 4 whereby to discharge the positive electric charge accumulated on the target membrane 4*a* thus forming a modulated return beam 23. Although the return beam 23 travels substantially the same path as the forward beam 22 it tends to spread substantially as it departs from target membrane 4*a* owing to difference in the initial speed vectors at the time of leaving the target surface or by the action of electrostatic field prevailing between the target and the deflection system. However, as mentioned above, since the first dynode 15*a* is positioned very close to the deflection system the return beam 23 is caused to impinge upon the first dynode 15*a* at a high efficiency. As a result the first dynode emits secondary electrons which are effectively introduced into the secondary electron multiplier section 15 by the action of the electric field produced by the persuader electrode 13. After amplification the secondary electrons are taken out as output signals which are supplied to the amplifier 45 located outside the tube.

As described above the electron beam emitted from the cathode electrode of the electron gun is first acted upon by the focussing system, passes through a small perforation of the first dynode 15*a*, and enters into the deflection system, then is caused to impinge at right angles upon the target, and all of the return beam from the target is caused to impinge upon the first dynode.

In this embodiment since the first dynode is located very close to the deflection system, i.e. the target, it is able to receive the return beam at a high efficiency so that secondary electron multiplication can be effected very satisfactorily, thus effectively eliminating such undesirable phenomena such as shading and the like.

Also, a single solenoid coil energized by a source of supply 43 is utilized in the magnetic field generating device 33 provided for the image section.

In the modification shown in FIG. 3, an image intensifier is provided for the image section 20 in order to provide a high sensitivity. The scanning section is identical with that utilized in the embodiment shown in FIG. 1.

Thus, there are provided a photocathode surface 3 on the inner surface of a faceplate 2 located at one end of an envelope 1, and an image intensifying dynode 16 disposed between the deflection system 11 and target 4 which is arranged to oppose the photocathode surface 3. The dynode is a transmission secondary electron dynode comprising a supporting film about 800 A. thick made of aluminum oxide facing toward the photocathode covered by a backing metal layer about 500 A. thick of aluminum which is in turn covered by an emitter about 500 A. thick of potassium chloride. Photoelectrons 24 emitted from the photocathode surface 3 are accelerated to a high speed by the action of an accelerating field produced by a first image focussing electrode 35 and a dynode cup electrode 54 and are then caused to impinge upon the dynode 16 to emit multiplied secondary electrons 21 from the surface of the dynode facing to the target 4. These electrons are accelerated by the accelerating field produced by a second image focussing electrode 5 and a target cup electrode 6 and then collide upon the target 4 to form a charge pattern on the target membrane 4*a*. This charge pattern is then scanned by an electron beam 22 to form a return beam 23 which is collected and intensified by a secondary electron multiplier section 15 to be derived as output signals supplied to an external circuit.

A focussing magnetic field produced by a cylindrical coil 33*c* which is located outside the tube to surround the the image section is effective in the image section to focus the image electron current 24. Voltages applied to respective electrodes from the voltage source 41 are for example −5000 v. for the photocathode surface 3, −4000 v. for the first image focussing electrode 53, −500 v. for the dynode cup electrode 54 and the transmission secondary electron dynode membrane, −400 v. for the second image focussing electrode and +2 v. for the target cup electrode 6, respectively.

According to this embodiment tubes of extremely high sensitivity can be obtained because the image electron current from the photocathode surface is intensified by the image intensifier.

Figures 4A, 4B:
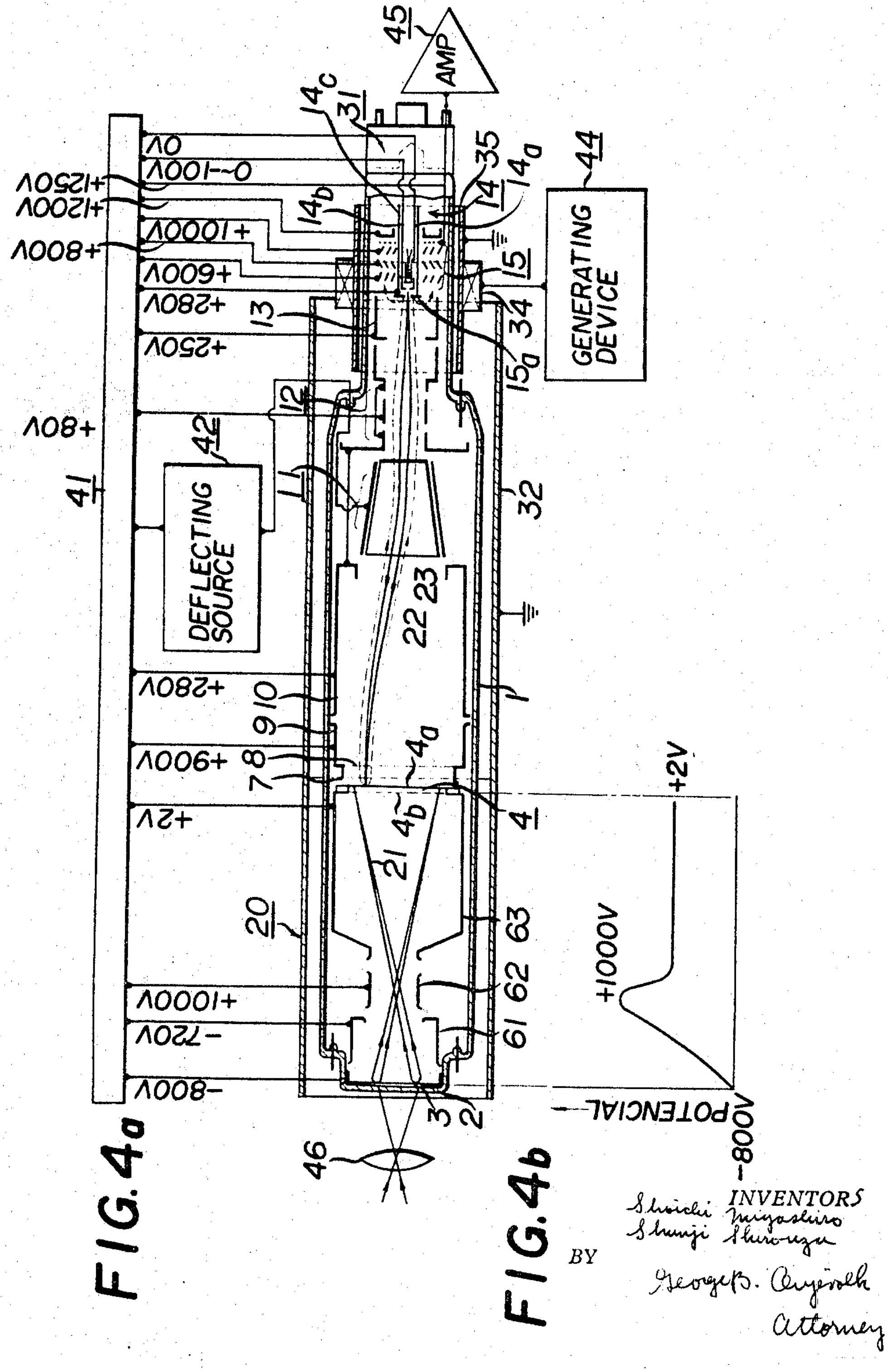
Figures 5A, 5B:
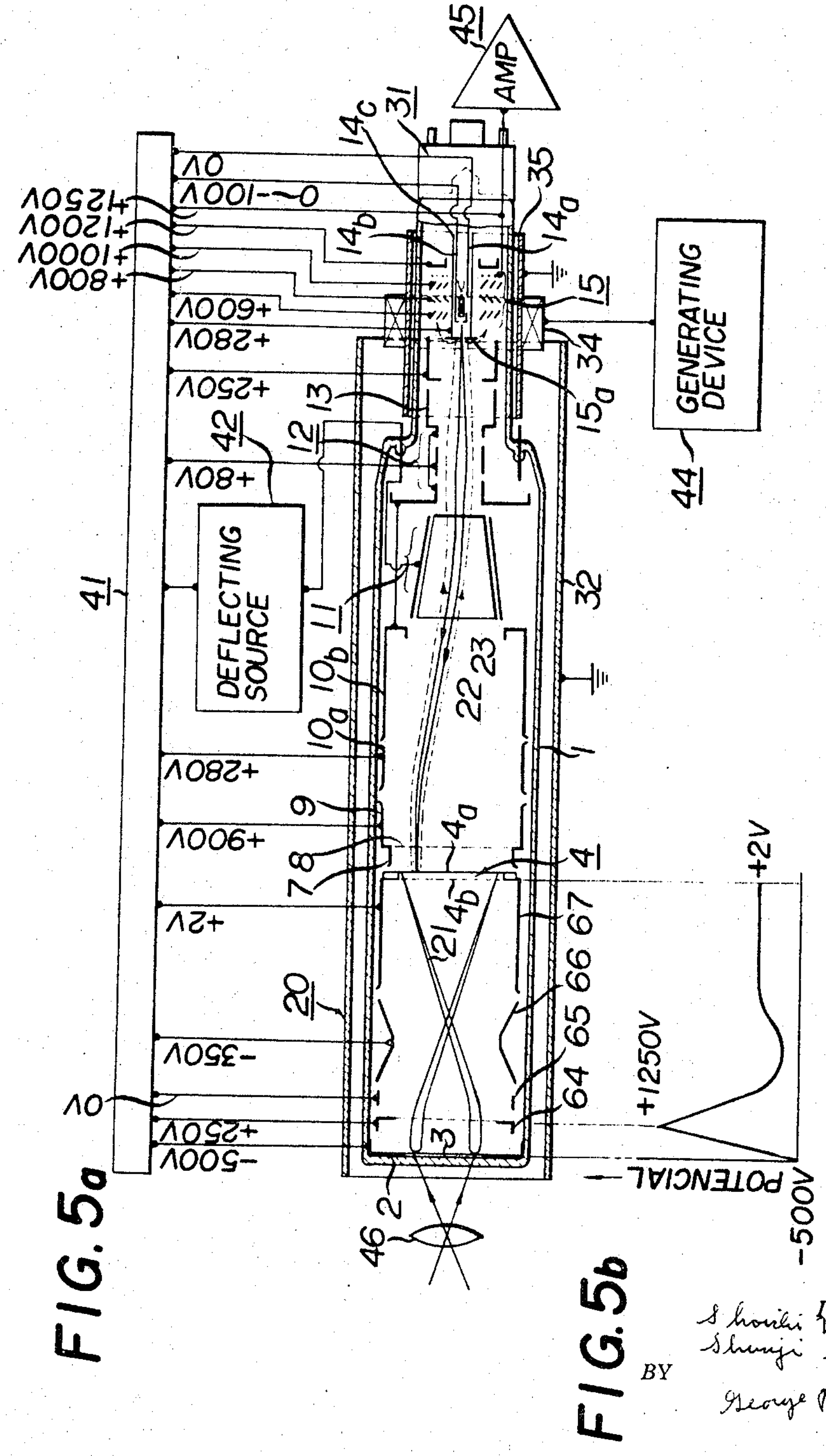

FIGS. 4*a* and 5*a* illustrate still another embodiment of this invention wherein an electrostatic system is utilized in the image section whereas the collimation lens electrodes, identical with those shown in FIG. 1, are utilized in the scanning section.

In the embodiment shown in FIG. 4*a* a photocathode surface 3 is provided on the inner surface of a faceplate comprising one end of a tubular envelope 1. Opposite to photocathode surface 3 is disposed a target 4 comprising a storage target 4*a* and a target mesh 4*b*, and an annular or cylindrical image focussing electrode 61 are arranged in succession between the photocathode surface 3 and the target 4 in the order mentioned, whereby an image section 20 is formed.

In this embodiment an electrode maintained at a potential higher than that of the main anode electrode 63 is arranged between the photocathode surface 3 and the main anode electrode. For example, when the cathode 14*a* of the electron gun is maintained at zero volt, the voltage relation of the electrodes of the electron image section is selected that −800 v. is impressed to the photocathode surface 3, −720 v. to the focussing electrode 61, +1000 v. to the auxiliary anode 62 which should be maintained at a potential higher than the anode and +2 v. to the main anode electrode 63. By this voltage relation a potential distribution, as shown in FIG. 4*b* is produced along the axis in the electron image section along the axis in the electron image section having the maximum potential value in the region through which the image electron current 21 flows. By this potential distribution electron images of less distortion and good resolution are focussed on the target. Also by adjusting the electrode voltages electronic zooming can be provided in a wide range. More particularly, the image section or the electrostatic type image orthicon constructed in accordance with this embodiment can provide various novel effects. In the image orthicon type image pickup tube, although utilization of a large target is one of the effective means for improving the signal to noise ratio, it is not advantageous to utilize correspondingly large optical lens, photocathode surface and the like to project optical images. According to this embodiment, however, it becomes possible to advantageously use a small optical lens and a small photocathode surface because it is very easy to provide an electron lens of large magnification. Moreover, among the secondary electrons which were emitted from the target membrane 4*a* by the collision of the image electron current 21, those pass into the main anode electrode 63 without being collected by the target mesh 4*b* will be attracted towards the auxiliary anode electrode 62 which is maintained at a higher potential. Therefore, it is able to prevent spurious signals due to redistribution of secondary electrons. There is another novel effect as follows: Suitably energy of the photoelectron current when it impinges upon the target of the image orthicon is generally of the order of from 300 to 1000 electron volts. According to this modification it is possible to impress a higher potential while maintaining the potential difference between the photocathode surface 3 and the main anode 63 or the target mesh 4*b* so that the intensity of the electric field in the space close to the photocathode surface is greatly increased thus sufficiently improving resolution.

In the embodiment shown in FIG. 5*a*, a photocathode surface 3 is formed on the inner surface of a face plate 2 disposed at one end of a tubular envelope 1, and a mesh electrode 64 is located adjacent to and in parallel with the photocathode surface 3. Also an annular first image focussing electrode 65, and an annular second image focussing electrode 66 and a cylindrical anode 67 are disposed in the order mentioned. The anode 67 serves also as a target cup electrode and a target 4 consisting of a storage target 4*a* and a target mesh 4*b* is arranged to oppose the mesh electrode 64.

Operating voltages are supplied to various electrodes from a source of voltage 41, viz, zero volt to the cathode electrode 14*a* of the electron gun, −500 v. to the photocathode surface 3, +1250 v. to the mesh electrode 64, zero volt to the first image focussing electrode 65, −350 v. to the second image focussing electrode 66, and +2 v. to the anode electrode 67. Thus, at least one of the focussing electrodes 65 and 66 situated between the mesh electrode 64 and the anode 67 is impressed with a voltage which is lower than those of the electrodes 64 and 67 so as to create a potential distribution along the tube axis as shown in FIG. 5*b*. Thus, FIG. 5*b* illustrates the potential distribution along the tube axis in the space defined between the photocathode surface 3 and the target 4, the potential distribution curve being plotted beneath the image section 20 of FIG. 5*a* to represent potential of the various elements thereof.

When an optical image is provided on the photocathode surface 3 through an optical lens system 46 the photocathode surface 3 will emit a photoelectron current 21 which is accelerated by the electric field described above to impinge upon the target membrane 4*a* to cause it to emit secondary electrons thus forming an electrostatic charge image corresponding to the optical image.

The charge image is scanned by the electron beam 22 which has emanated from the electron gun 14, the information component thereof being multiplied by the electron multiplier section 15 by utilizing the return beam 23 as the carrier and is then supplied to the amplifier 45 located outside the tube.

In this embodiment the sixth grid electrode is divided into two sections 10*a* and 10*b* for easy adjustment of the field distribution. If desired this grid electrode may be divided into more sections.

According to this embodiment the charge images are formed on the target without any appreciable distortion and with better resolution at the periphery. Moreover it is able to produce images of higher lens magnification with shorter distance. As a result it is able to readily obtain electrostatic type image orthicons of excellent characteristics and shorter length.

While the novel storage device has been described with respect to some preferred embodiments thereof it should be understood that this invention is by no means limited thereto and that many changes and modifications may be made therein without departing from the true spirit and scope of the invention as defined in the appended claims.

What is claimed is:

1. A storage device comprising an evacuated envelope, an electron gun disposed in said envelope to emit an electron beam, a target disposed to face said electron gun upon which said electron beam impinges at a low speed, a first annular electrode with a larger inner diameter than the effective diameter of said target and located adjacent to said target on the side thereof facing said electron gun, a second annular electrode connected to said first annular electrode to extend towards said electron gun, said second annular electrode having an axial length less than 0.45 times of its inner diameter, a field mesh mounted in parallel with said target at the joint between said first and second annular electrodes, a deflection system adapted to make horizontal and vertical deflections of said electron beam to cause it to scan said target, the effective centers of said horizontal and vertical deflections being adapted to coincide with each other, said centers being spaced from said field mesh by a distance equal to from 1.25 to 4.25 times of the inner diameter of said second annular electrode, and means to supply to said field mesh the maximum potential with respect to said electron beam.

2. The storage device according to claim 1 wherein said storage device includes an image section on the side opposite to the electron gun of said storage target and said image section comprises a photocathode surface opposing said target, and electrode means located between said target and said photocathode surface to produce an electric field adapted to accelerate and focus an image electron current emitted from said photocathode surface whereby said photoelectrons are electrostatically focused on said target.

3. The storage device according to claim 2 wherein said electric field producing electrode means comprises an annular or cylindrical first electrode adapted to provide a potential distribution for accelerating and focussing said image electron current, and a second electrode consisting of at least one annular or cylindrical electrode which is located between said photocathode surface and said first electrode to produce a potential which is higher than the potential of said first electrode in a space through which said image electron current flows.

4. The storage device according to claim 2 which comprises a mesh electrode mounted adjacent to and in parallel with said photocathode surface, an annular anode located on one side of said target adjacent to said mesh electrode, at least one annular focussing electrode positioned between said mesh electrode and said anode, and a source of potential which supplied operating potentials to various electrodes, said source of potential including means to impress a lower potential to at least one of said annular focussing electrodes than the potentials of said mesh electrode and said anode.

5. A storage device comprising an evacuated air tight envelope, an electron gun disposed in said envelope to emit an electron beam, a focussing electrode to focus said electron beam, a charge storage target disposed to oppose said electron gun upon which said electron beam impinges at a low speed, a first annular electrode provided adjacent said target on the side thereof facing said electron gun, said electrode having an inner diameter larger than the effective diameter of said target, a second annular electrode connected to said first annular electrode to extend towards said electron gun, said second annular electrode having an axial length less than 0.45 times of its inner diameter, a field mesh mounted in parallel with said target at the joint between said first and second annular electrodes, horizontal and vertical electrostatic deflection electrodes adapted to deflect said electron beam to scan said target, said deflection electrodes having substantially the same deflection center at a joint spaced from said mesh by a distance equal to from 1.25 to 4.25 times of the inner diameter of said second annular electrode on the same side as said electron gun, a source of voltage for applying operating voltage to each of said electrodes, means to maintain said field mesh at the maximum potential with respect to said electron beam, a secondary electron multiplier including a first dynode adapted to collect through said electrostatic deflection electrodes a return beam which is produced by modulating the electric charge accumultaed on said target by scanning said target with said electron beam, and means to obtain from said multiplier an image signal corresponding to said accumulated charge.

6. The storage device according to claim 5 wherein the first dynode of said secondary electron multiplier adapted to receive said return beam is positioned between said electrostatic deflection system and said focussing electrode.

7. The storage device according to claim 5 wherein the first dynode of said electron multiplier is arranged between the electron gun and the focussing electrode and said return beam is collected after it has passed through said electrostatic deflection system and said focussing electrode.

8. The storage device according to claim 5 which comprises a tubular envelope, a shoulder stem provided for said envelope adjacent said electrostatic deflection electrode, conductor strips mounted on said shoulder stem, lead wires electrically interconnecting said conductive strips to said electrostatic deflection electrode, means to connect said conductive strips to a deflection source, a stem provided for said envelope at one end thereof adjacent said electron gun, conductive strips extending through said stem, and lead wires adapted to connect the output signal electrode of said electron multiplier to said second mentioned conductive strips, conductive strips which derive out image signals being separated in the axial direction of said envelope from conductive strips which supply deflection power so that image signals may not be affected by said deflection power.

9. The storage device according to claim 5 wherein said storage device includes an image section on the side opposite to the electron gun of said storage target and said image section comprises a photocathode surface opposing said target, and electrode means located between said target and said photocathode surface to produce an electric field adapted to accelerate and focus an image electron current emitted from said photocathode surface whereby said photoelectrons are electrostatically focussed on said target.

10. The storage device according to claim 9 wherein said electric field producing electrode means comprises an annular or cylindrical first electrode adapted to provide a potential distribution for accelerating and focussing said image electron current, and a second electrode consisting of at least one annular or cylindrical electrode which is located between said photocathode surface and said first electrode to produce a potential which is higher than the potential of said first electrode in a space through which said image electron current flows.

11. The storage device according to claim 9 which comprises a mesh electrode mounted adjacent to and in parallel with said photocathode surface, an annular anode located on one side of said target adjacent to said mesh electrode, at least one annular focussing electrode positioned between said mesh electrode and said anode, and a source of potential which supplies operating potentials to various electrodes, said source of potential including means to impress a lower potential to at least one of said annular focussing electrodes than the potentials of said mesh electrode and said anode.

12. A storage device comprising an evacuated tubular envelope, an electron gun provided near one end of said envelope, a storage target mounted to face said electron gun and adapted to be scanned at a low speed by an electron beam emitted from said electron gun, a first annular electrode adjacent said target on the side thereof facing said electron gun, said annular electrode having a diameter larger than that of said target, a second annular electrode connected to said first annular electrode and having an axial length less than 0.45 times of the inner diameter thereof, a mesh electrode mounted in parallel with said target at the joint between said first and second annular electrodes, said mesh electrode being maintained at the highest potential with respect to said electron beam, an electron scanning section including deflecting systems which are so disposed that the horizontal and vertical deflections of said electron beam have effectively identical center of deflection and spaced from said mesh electrode by a distance equal to from 1.25 to 4.25 times of the inner diameter of said second annular electrode, said scanning section acting to cause deflected electron beam to impinge at low speed and substantially at right angles upon said target, a photocathode provided on the opposite end of said envelope to emit photoelectron when light beam impinges thereon, and an image section provided between said storage target and said photocathode electrode to transmit photoelectron current to said storage target, said image section including means to produce electric field along the path of said photoelectron current and a magnetic field producing means located symmetrical with respect to the tube axis adjacent the peripheral portion of the image to generate magnetic field which is symmetrical with respect to the tube axis.

13. The storage device according to claim 12 wherein said magnetic field generating device comprises an electromagnetic coil.

14. The storage device according to claim 12 wherein said focussing magnetic field device comprises a permanent magnet.

15. The storage device according to claim 12 wherein said focussing magnetic field device is divided into a plurality of sections along the tube axis.

16. The storage device according to claim 15 wherein said focussing magnetic field device comprises a combination of an electromagnetic coil and a permanent magnet.

References Cited

UNITED STATES PATENTS 2,943,231 6/1960 Boulet et al. ---------- 315—12

RODNEY D. BENNETT, *Primary Examiner.*

JEFFREY P. MORRIS, *Assistant Examiner.*

U.S. Cl. X.R.

315—31